March 13, 1945. W. HUPPERT Re. 22,617

COMB

Original File: Aug. 7, 1941

INVENTOR
WILLIAM HUPPERT
BY
Lester E. Clerkin
ATTORNEY

Reissued Mar. 13, 1945

Re. 22,617

UNITED STATES PATENT OFFICE 22,617

COMB

William Huppert, New York, N. Y., assignor to Delamere Company, Inc., a corporation of Delaware Original No. 2,276,273, dated March 17, 1942, Serial No. 405,726, August 7, 1941. Application for reissue December 16, 1943, Serial No. 514,574

8 Claims. (Cl. 132—26)

This invention relates to a comb of the type intended to be worn in the hair to keep the hair in place as well as for the purpose of ornamentation.

An object of the invention is to provide a comb that may be easily inserted in the hair to fasten the hair neatly and securely in place.

Another object is to provide a comb that will remain in its inserted position without slipping and without the use of any auxiliary retaining means.

Further objects are to provide a comb of novel, simple, and inexpensive construction.

The comb has a highly resilient back formed with a row of teeth projecting therefrom. The teeth are somewhat blade-shaped, having their middle portions in contact, or substantially in contact, and tapering both towards the lower and upper ends to provide hair entering spaces between the lower ends and hair receiving spaces between the upper ends. Upon inserting the comb into the hair, which may be done by merely pushing it into place, the teeth will spread because of the flexibility and resiliency of the back, thus permitting the hair to pass through the normally closed or constricted passages between the middle portions of adjacent teeth into the enlarged spaces between the upper ends of the teeth. When the comb is so inserted, the resiliency of the back will cause the teeth to close and to wedge or lock the hair in the spaces between their upper ends.

The invention will appear more fully from the following description thereof, reference being had to the accompanying drawing, in which.

Figure 1:
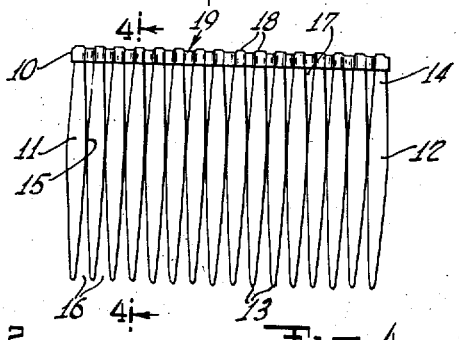
Figure 1 is a face view of a comb embodying the invention.

The comb may be made of metal, plastic, or other suitable material. It comprises, generally, a back 10 and a set of teeth 11 projecting from the back.

A distinguishing feature of the present invention is that the back 10 is of a highly flexible and resilient construction, permitting of flexure and resilience not only in the direction of its length but in other directions as well.

The teeth are blade-shaped, each having a relatively broad or wide middle portion 12 and tapering from said portion both towards the lower ends 13 and the upper ends or roots 14. The teeth are so disposed that the proximate edges 15 of the middle portions of adjacent teeth contact, or substantially contact, each other. The spaces 16 between the lower ends of the teeth control the amount of hair to be received, and eventually locked, in the spaces 17 between the upper ends of the teeth. The teeth may be shaped with a compound curvature in profile, as shown in Figs. 4 and 6, although such curvature is not essential to the invention.

Figure 2:
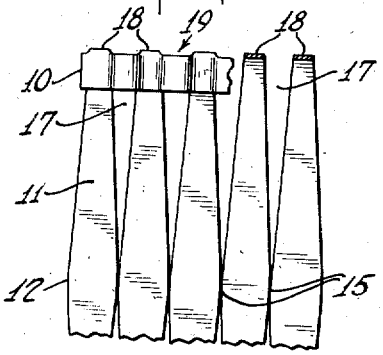
Fig. 2 is a fragmentary view on an enlarged scale, with a portion of the back broken away.
Figure 4:
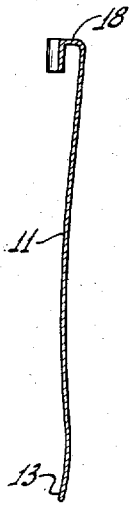
Fig. 4 is a section in elevation taken on the line 4—4 of Figure 1.

In the form of the invention illustrated in Figs. 1 and 4, the back 10 is offset from the plane of the teeth 11 in the manner described in my Reissue Patent No. 21,131 of June 27, 1939, and is connected to the teeth by integral connecting portions 18 that are so disposed as to be hidden by the hair when the comb is in place. Corrugations 19 are formed in the back between the upper ends of the teeth, as best seen in Fig. 2, to increase the flexibilty and resiliency of the back as well as for the purpose hereinafter described.

Figure 6:
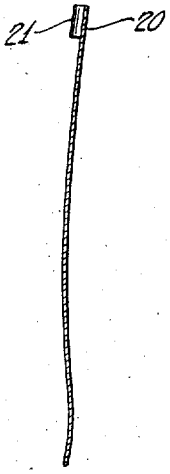
Fig. 6 is a section in elevation thereof, taken on the line 6—6 of Fig. 5.
Figure 3:
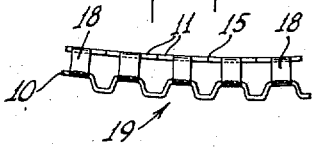
Fig. 3 is a top plan view of the comb.
Figure 5:
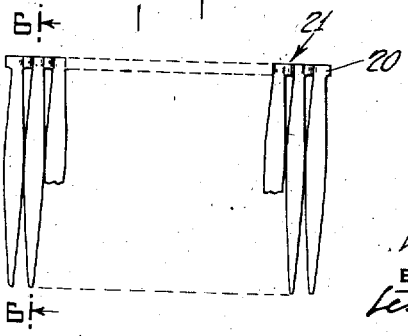
Fig. 5 is a conventionalized face view of a modification.

A modification of the invention is illustrated in Figs. 5 and 6 in which the back 20 extends in the general plane of the teeth, instead of being offset from them, and is formed with corrugations 21 between the upper ends of the teeth.

The comb, when made of metal, may be stamped from a flat blank of suitable sheet metal and bent to shape. In this case the corrugations 19 further serve to draw the adjacent teeth together after they have been stamped in spaced-apart relation from the blank. Where the comb is formed of plastic material, it may be made by any known molding process.

Because of the high flexibility and resiliency of the back, upon insertion of the comb into the hair by merely pushing it into place, the teeth will spread apart slightly permitting the hair to enter into the spaces 17 and to be locked therein, thus not only holding the hair in place but preventing the comb from slipping.

I am aware that one of the early improvements in combs is disclosed in Patent No. 754,949 to Wilcox, who proposed to provide a comb in which the points or lower ends of the teeth meet on a curved line and are sprung out of their normal plane laterally to produce a clamping or gripping action on the hair. Patent No. 1,684,362 to Sawyer describes a comb having teeth spaced closely together and formed with elongated central openings so constructed that the side walls of the teeth will yield laterally to grip and hold a strand of hair inserted between adjacent teeth. In my Reissue Patent No. 22,035 I have shown a comb having overlapping teeth that flex out of their normal plane to permit of passage of hair between the overlapping portions. In each instance the grip on the hair is occasioned by a flexure or yielding of the teeth themselves or by a manual flexure of the comb. I have found that providing a comb with a highly flexible and resilient back decreases the resistance to insertion of the comb in the hair and increases its gripping action on the hair.

According to the present invention the back of the comb is so flexible that the slight resistance offered by the hair itself during insertion of the comb is sufficient automatically to flex the back and to spread the teeth apart, the teeth then closing together by the inherent resiliency of the back to grip the hair firmly in the spaces between the roots of the teeth and to hold the comb against slippage.

Various modifications in the details of construction herein shown and described may be made without departing from the scope of the invention as defined in the claims.

What I claim is:

1. A hair retaining comb comprising a flexible and resilient back and a set of teeth projecting therefrom, said teeth having relatively wide middle portions, with the lateral edges of the wide portions of adjacent teeth substantially contacting each other, and tapering from the wide portion both toward the lower and upper ends, said back having corrugations in the spaces between adjacent teeth.

2. A hair retaining comb comprising a flexible and resilient back and a set of teeth projecting therefrom, said teeth having relatively thin and wide middle portions, with the lateral edges of the wide portions of adjacent teeth substantially contacting each other, and tapering from the wide portion both towards the lower and upper ends, the back being of substantially the same thickness as the teeth and having corrugations in the spaces between adjacent teeth.

3. A comb comprising a back of flexible resilient material and teeth projecting from the back, said teeth having intermediate portions that substantially contact each other, said back having substantially U-shaped resilient portions in the spaces between adjacent teeth.

4. A comb comprising a back of flexible resilient material, and teeth projecting from the back, said teeth having intermediate portions that substantially contact each other, and hair retaining spaces between the roots of the teeth above said portions, said back having corrugations in the spaces between adjacent teeth.

5. A comb formed from a relatively thin piece of flexible resilient metal comprising a back and a set of teeth projecting therefrom, said teeth having relatively wide intermediate portions that substantially contact each other, and hair receiving spaces between the upper ends of the teeth above said intermediate portions, said back having corrugations in the spaces between adjacent teeth.

6. A comb comprising a flexible resilient back, and a set of teeth having relatively wide intermediate portions tapering therefrom both toward their lower and upper ends, the intermediate portions of adjacent teeth being substantially in contact with each other, said back having substantially U-shaped resilient portions between adjacent teeth whereby the back is sufficiently flexible and resilient to cause the teeth automatically to spread by the resistance offered by the hair during insertion of the comb into the hair and then to close together to retain the hair securely in the spaces between the upper ends of the teeth.

7. A hair retaining comb comprising a plurality of teeth having intermediate portions that substantially contact each other, and a resilient member connecting their upper ends, said connecting member having corrugations between the upper ends whereby on spreading the teeth tension is provided to effect a gripping action on the hair, said corrugations extending transversely of the length of the connecting member.

8. A hair retaining comb comprising a plurality of teeth having intermediate portions that substantially contact each other, and a member connecting the teeth together at their upper ends, said connecting member having substantially U-shaped resilient portions between the upper ends of the teeth which portions are of greater length than the spaces between the teeth, whereby on spreading the teeth tension is provided to effect a gripping action on the hair.

WILLIAM HUPPERT.